US012747392B2

(12) United States Patent
Chappellet et al.

(10) Patent No.: US 12,747,392 B2
(45) Date of Patent: Sep. 29, 2026

(54) LIQUID CRYSTAL COMPOUNDS

(71) Applicant: ROLIC TECHNOLOGIES AG, Allschwil (CH)

(72) Inventors: Sabrina Chappellet, Allschwil (CH); Tobias Von Arx, Allschwil (CH)

(73) Assignee: ROLIC TECHNOLOGIES AG, Allschwil (CH)

( * ) Notice: Subject to any disclaimer, the term of this patent is extended or adjusted under 35 U.S.C. 154(b) by 0 days.

(21) Appl. No.: 19/111,020

(22) PCT Filed: Sep. 15, 2023

(86) PCT No.: PCT/EP2023/075449
§ 371 (c)(1),
(2) Date: Mar. 12, 2025

(87) PCT Pub. No.: WO2024/068311
PCT Pub. Date: Apr. 4, 2024

(65) Prior Publication Data

US 2026/0085241 A1 Mar. 26, 2026

(30) Foreign Application Priority Data

Sep. 26, 2022 (EP) .................................... 22197739

(51) Int. Cl.
*G02F 1/1333* (2006.01)
*C09K 19/18* (2006.01)
*C09K 19/04* (2006.01)

(52) U.S. Cl.
CPC ...... *C09K 19/18* (2013.01); *C09K 2019/0448* (2013.01); *C09K 2019/181* (2013.01)

(58) Field of Classification Search
CPC ............ C09K 19/38; C09K 2019/0448; G02F 1/1333
See application file for complete search history.

(56) References Cited

U.S. PATENT DOCUMENTS

| | | | |
|---|---|---|---|
| 5,798,147 | A | 8/1998 | Beck et al. |
| 2002/0006479 | A1 | 1/2002 | Sekine et al. |

FOREIGN PATENT DOCUMENTS

| | | | | |
|---|---|---|---|---|
| DE | 10064291 A1 | 7/2001 | | |
| EP | 1090325 A1 | 4/2001 | | |
| JP | 2015-205843 A | 11/2015 | | |
| WO | 2012/085048 A1 | 6/2012 | | |
| WO | WO-2024200529 A1 * | 10/2024 | ............ | C09K 19/18 |

OTHER PUBLICATIONS

Arakawa et al., "Highly birefringent polymer films from the photo-crosslinking polymerisation of bistolane-based methacrylate monomers", Liquid Crystals, 2015, vol. 42, No. 10, pp. 1419-1427.
International Search Report for PCT/EP2023/075449 dated Nov. 30, 2023 (PCT/ISA/210).
Written Opinion for PCT/EP2023/075449 dated Nov. 30, 2023 (PCT/ISA/237).

* cited by examiner

*Primary Examiner* — Geraldina Visconti
(74) *Attorney, Agent, or Firm* — Sughrue Mion, PLLC

(57) ABSTRACT

The invention relates to novel polymerizable liquid crystals of formula (I), to LCP mixtures comprising these compounds and to their uses for optical and electro-optical devices:

(I)

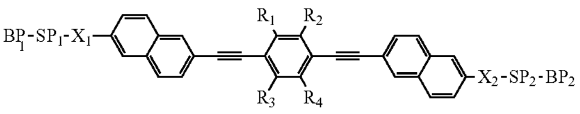

18 Claims, No Drawings

LIQUID CRYSTAL COMPOUNDS

CROSS REFERENCE TO RELATED APPLICATIONS

This application is a National Stage of International Application No. PCT/EP2023/075449 filed Sep. 15, 2023, claiming priority based on European Patent Application Ser. No. 22/197,739.0 filed Sep. 26, 2022.

The present invention relates to substituted curable Liquid Crystal (LCPs) with high optical anisotropy and the use of such LCPs in the preparation of substantially uniform or patterned film in which the orientation of the LCP molecules can be controlled.

In the display industry optical LCP films are used for the provision or enhancement of optical or electro optical effects, such as for polarizers. Displays are getting more and more thinner. Hence, there is a growing demand from this industry for thinner optical LCP films providing the desired optical or electro-optical effects.

Retardation films are a type of optical elements which change the polarization state of light passing through the same. When light passes through a phase retarder its polarization direction changes because of the birefringence and the thickness of the phase retarder. One of the biggest issues in preparation of phase retarders is to prepare high performing films at a small charge. When liquid crystals having high birefringence are used, it is possible to realize the necessary retardation value with small quantities of liquid crystals compounds.

LCP materials with high birefringence could give access to thin optical films.

Therefore, it was the task of the present invention to search for new LCP material having high birefringence and are applicable for optical films.

A first aspect of the present invention provides a compound, preferably a liquid crystal, of formula (I)

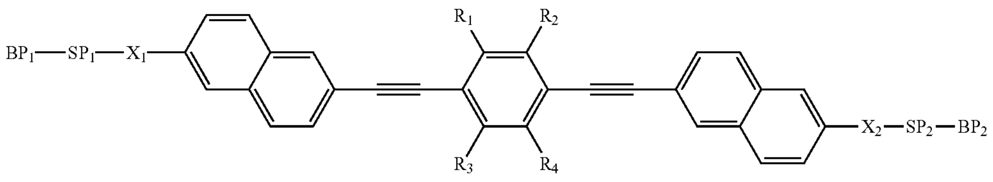

(I)

wherein $SP_1$ and $SP_2$ each independently from each other represents a group of the formula —$(CH_2)$p- in which p is an integer of 1 to 18 and in which one or more, especially —$CH_2$— groups are unreplaced or replaced by a group selected from the group consisting of —CH═CH—; —O—, —S—, —NR'—, —CO—, —COO—, —OOC—, —CONR'—, —OCOO— and —OCONR' with the proviso that firstly the spacer group does not contain two adjacent heteroatoms, and secondly when $X_1$, $X_2$, $X_3$ and $X_4$ is a single bond, p can also have a value of 0;

$X_1$ and $X_2$ each independently from each other is selected from the group consisting of —O—, —S—, —NR'—, —CO—, —COO—, —OOC—, —CONR'—, —OCOO—, —OCONR' and a single bond; in which R' is selected from the group consisting of hydrogen, a $C_1$-$C_{18}$alkyl group;

$BP_1$ and $BP_2$ each independently from each other represents a polymerizable group, $R_1$, $R_2$, $R_3$ and $R_4$ each independently from each other are selected from the group consisting of hydrogen, halogen, —$OR_5$, —$COOR_5$, —$OCOR_5$, —$CONR_5$, —$OCOOR_5$, —$OCONR_5$ and a $C_1$-$C_{18}$alkyl group, wherein $R_5$ is selected from the group consisting of $C_1$-$C_{18}$alkyl, aryl, aralkyl and alkylaryl.

The spacer group $SP_1$ and $SP_2$ each independently from each other are unsubstituted or substituted by one or more fluorine or chlorine atoms. Groups in which there are no substituent groups present are preferred. It is especially preferred that the integer p has a value from 1, 2, 3, 4, 5, 6, 7, 8, 9, 10, 11 or 12, and more especially preferred the integer p has a value of 1, 2, 3, 4, 5, 6, 7, 8. Further it is especially preferred $SP_1$ and $SP_2$ each independently from each other represents a group of the formula —$(CH_2)$p-, which is unreplaced, or wherein one, two, three or four —$CH_2$— groups are replaced by one group selected from the group consisting of —CH═CH—, —O—, —CO—, —COO—, —OOC—, —CONR'—, —OCOO— and —OCONR', especially —O—, —CO—, —COO—, —OOC—, and —OCOO—.

The naphthalene groups in formula (I) each independently from each other are unsubstituted or substituted by one or two substituents selected from the group consisting of fluorine or chlorine atoms, nitril, $C_1$-$C_6$alkyl, $C_1$-$C_6$alkenyl, $C_1$-$C_6$alkoxy and $C_1$-$C_6$alkenyloxy. Preferably the naphthalene groups each contain no more than one additional substituent. It is especially preferred that the naphthalene groups contain no additional substitution.

The groups $X_1$ and $X_2$ each independently from each other are preferably selected from the group consisting of —O—, —COO—, —OOC—, —OCOO—, and a single bond; It is especially preferred that $X_1$, $X_2$, $X_3$ and $X_4$ each independently from each other are selected from —O— or a single bond.

Preferred groups $R_1$, $R_2$, $R_3$ and $R_4$ each independently from each other are selected from the group consisting of hydrogen, —$OR_5$, —$COOR_5$, —$OCOR_5$, —$OCOOR_5$, and a $C_1$-$C_6$alkyl group, wherein $R_5$ is selected from the group consisting of a $C_1$-$C_6$alkyl. More preferred groups $R_1$, $R_2$, $R_3$ and $R_4$ each independently from each other are selected from the group consisting of hydrogen, —$OR_5$, —$COOR_5$, —$OCOR_5$, —$OCOOR_5$, and a $C_1$-$C_6$alkyl group;

especially selected from the group consisting of hydrogen, and —COORS;

wherein $R_5$ is selected from the group consisting of a $C_1$-$C_{18}$alkyl, and with the proviso that at least one $R_1$, $R_2$, $R_3$ or $R_4$ is hydrogen, especially that at least two of $R_1$, $R_2$, $R_3$ or $R_4$ are hydrogen, and more especially that at least three of $R_1$, $R_2$, $R_3$ or $R_4$ are hydrogen.

The groups $BP_1$ and $BP_2$ each independently from each other are preferably selected from the group consisting of $CH_2$═C(Ph)-, $CH_2$═CW—COO—, $CH_2$═CH—COO-Ph-, $CH_2$═CW—CO—NH—, $CH_2$═CH—O—, $CH_2$═CH—OOC—, Ph-CH═CH—, $CH_2$═CH-Ph-, $CH_2$═CH-Ph-O—, $R_6$-Ph-CH═CH—COO—, $R_6$—OOC—CH═CH-Ph-O— and 2-W-epoxyethyl, in which W represents hydrogen, chloride, aryl or a $C_1$-$C_6$alkyl, $R_6$ represents a $C_1$-$C_6$alkyl with the proviso that when $R_6$ is attached to an aryl group it may also represent hydrogen or a $C_1$-$C_6$alkoxy.

Especially, the groups $BP_1$ and $BP_2$ each independently from each other are preferably selected from the group consisting of $CH_2$═CW—COO—, $CH_2$═CH—O—, and $CH_2$═CH—OOC—, in which W represents hydrogen, chloride, aryl or a $C_1$-$C_6$alkyl, preferably hydrogen or a $C_1$-$C_6$alkyl.

By the term "alkyl" it should be understood to include $C_1$-$C_{18}$alkyl, preferably $C_1$-$C_{12}$alkyl and especially $C_1$-$C_6$alkyl. The term alkyl comprises an achiral, branched or straight-chained, substituted or unsubstituted alkyl group. Examples of alkyl groups that may be present in the compounds of the invention include methyl, ethyl, propyl, iso-propyl, n-butyl, sec.-butyl-, isobutyl, tert, -butyl, iso-pentyl, n-pentyl, n-hexyl, iso-hexyl, n-heptyl, iso-heptyl, n-octyl, iso-octyl, n-nonyl, iso-nonyl, n-decyl, iso decyl, n-undecyl, iso-undecyl, n-dodecanoyl, iso-dodecanoyl, or 2-methylpropane, 2-methylbutane, 3-methylpentane, 2-methylhexane, 3-methylhexane.

By the term "alkenyl" it should be understood to include $C_1$-$C_{18}$alkenyl, preferably $C_1$-$C_{12}$alkenyl and especially $C_1$-$C_6$alkenyl. The term alkenyl comprises achiral, branched or straight-chained, substituted or unsubstituted alkenyl group in which the double bond is at position 2- or higher. Examples of alkenyl groups that may be present in the compounds of the invention include 2-propenyl, 3-butenyl, 3-isopentenyl, 4-pentenyl, 5-hexenyl, 4-isohexenyl and the like.

By the term "alkoxy" it should be understood to include it should be understood to include $C_1$-$C_{18}$alkoxy, preferably $C_1$-$C_{12}$alkoxy and especially $C_1$-$C_6$alkoxy. The term alkoxy comprises achiral, branched or straight-chained, substituted or unsubstituted alkoxy group. Examples of alkoxy groups that may be present in the compounds of the invention include methoxy, ethoxy, propoxy, isopropoxy, n-butoxy, sec.-butoxy, isobutoxy, tert, -butoxyl, iso-pentoxy, n-pentoxy, n-hexoxy, iso-hexoxy, n-heptoxy, iso-heptoxy, n-octoxy, iso-octoxy, n-nonoxy, iso-nonoxy, n-decoxy, iso decoxy, n-undecoxy, iso-undecyl, n-dodecanoyl, iso-dodecanoyl and the like.

By the term "alkenyloxy" it should be understood to include $C_1$-$C_{18}$alkenyloxy, preferably $C_1$-$C_{12}$alkenyloxy and especially $C_1$-$C_6$alkenyloxy. The term alkenyloxy comprises achiral, branched or straight-chained, substituted or unsubstituted alkenyloxy group in which the double bond is at position 2- or higher. Examples of lower alkenyloxy groups that may be present in the compounds of the invention include 2-propenyloxy, 3-butenyloxy, 4-pentenyloxy, 5-hexenyloxy and the like.

The substituents of "alkyl", "alkenyl", "alkoxy" and "alkenyloxy" are for example halogene, such as fluorine, nitrile, $C_1$-$C_{11}$alkoxy, trifluormethyl, 4-(4-alkoxyhoxyphenyl)benzonitrile.

By the term "aryl" it should be understood to include an aromatic ring, preferably an aromatic hydrocarbon, and especially phenyl and naphthyl, very especially phenyl.

By the term "aralkyl" is any univalent radical derived from an alkyl radical by replacing one or more hydrogen atoms by aryl groups. It should be understood to include phenethyl and the like.

By the term "alkylaryl" it should be understood to include methlyphenyl, ethylphenyl, propylphenyl and the like.

The halogen substituent as used in the present invention comprises fluorine, bromine, chlorine, iodine, and especially a fluorine.

Preferred, the present invention provides a compound, preferably a liquid crystal, of formula (I)

(I)

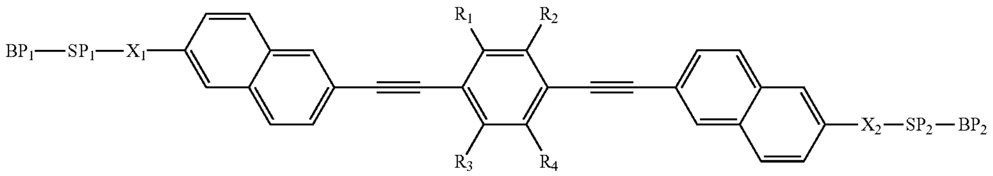

wherein $SP_1$ and $SP_2$ each independently from each other represents a group of the formula —($CH_2$)p- in which p is an integer of 1, 2, 3, 4, 5, 6, 7, 8, 9, 10, 11 or 12 and which group of the formula —($CH_2$)p- is unreplaced; or in which one, two, three or four —$CH_2$— groups are replaced by one group selected from the group consisting of —CH═CH—, —O— —CO—, —COO—, —OOC—, and —OCOO—, with the proviso that firstly the spacer group does not contain two adjacent heteroatoms and secondly when $X_1$ and $X_2$ is a single bond, p can also have a value of 0;

$X_1$ and $X_2$ each independently from each other is selected from the group consisting of —O—, CO—, —COO—, —OOC—, —OCOO—, and a single bond;

$BP_1$ and $BP_2$ each independently from each other are selected from the group consisting of $CH_2$═C(Ph)-, $CH_2$═CW—COO—, $CH_2$═CH—COO-Ph-, $CH_2$═CW—CO—NH—, $CH_2$═CH—O—, $CH_2$═CH—OOC—, Ph-CH═CH—, $CH_2$═CH-Ph-, $CH_2$═CH-Ph-O—, $R^3$-Ph-CH═CH—COO—, $R^6$—OOC—CH═CH-Ph-O— and 2-W-epoxyethyl, in which W represents hydrogen, chloride, aryl or a $C_1$-$C_6$alkyl, $R_6$ represents a $C_1$-$C_6$alkyl with the proviso that when $R_6$ is attached to an aryl group it may also represent hydrogen or a $C_1$-$C_6$alkoxy, $R_1$, $R_2$, $R_3$ and $R_4$ each independently from each other are selected from the group consisting of hydrogen, —$OR_5$, —$COOR_5$, —$OCOR_5$, —$OCOOR_5$, and a $C_1$-$C_6$alkyl group, wherein $R_5$ is $C_1$-$C_{12}$alkyl, preferably $C_1$-$C_{12}$alkyl and more preferably methyl, ethyl, propyl, isopropyl, butyl, n-butyl, sec. butyl, tert. Butyl, n-pentyl, iso pentyl, n-hexyl, iso hexyl.

The starting materials are commercially available or may be readily prepared and are well known to a skilled person.

A LCP material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer. Polymerization may be initiated by thermal treatment or by exposure to actinic light, which preferably comprises UV-light. The LCP-material may comprise only a single type of liquid crystal compound but may also comprise additional polymerizable and/or non-polymerizable compounds, wherein not all of the compounds have to be liquid crystal compounds. Further, an LCP material may contain additives, including but not limited to antioxidants, initiators, such as photoinitiators, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents; a polymeric binder and/or monomeric compounds which can be converted into the polymeric binder by polymerization, or, in the case of emulsion coatings and printing inks, a dispersion auxiliary, such as disclosed in U.S. Pat. No. 5,798,147; hydrophobing agents, adhesive agents, flow improvers, defoaming agents, deaerators, diluents, auxiliaries, colorants, dyes and pigments, curing inhibitors, such as hydroquinone, p-tert.-butyl catechol; 2,6-di tert.-butyl-p-methylphenol; phenothiazine; N-phenyl-2-naphthylamine; or a photo-orientable monomer or oligomer or polymer as described in EP 1 090 325 B, a chiral additive, isotropic or anisotropic fluorescent and/or non-fluorescent dyes, in particular dichroic dyes.

It will be appreciated that the compounds of the invention may be used in the preparation of LCP mixtures. Such mixtures may be prepared by admixing a compound of formula (I) with one or more additional components. An organic solvent may also be used in the preparation of these mixtures.

A second aspect of the invention therefore provides a LCP mixture comprising a compound of formula (I) and one or more additional components.

The LCP mixture may also include a suitable organic solvent.

Examples of solvents that may be used in the preparation of such liquid crystalline mixtures include but not limited to, acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), 1,3-dioxolane (DXG), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO).

Most preferred are cyclopentanone (CP), cyclohexanone (CH), methyl isobutyl ketone (MIBK), methylethylketone (MEK), ethyl acetate (EA), 1-methoxy-2-propanol acetate (MPA), 1,3-dioxolane (DXG), dimethyl sulfoxide (DMSO).

Dichroic dyes refer to dyes in which the absorbance varies between a longer axis direction and a shorter axis direction of a molecule. Dichroic dyes preferably absorb visible light. Examples of dichroic dyes include azo dyes, acridine dyes, oxazine dyes, cyanine dyes, naphthalene dyes and anthraquinone dyes. These dichroic dyes can be used individually or in combination. The amount of dichroic dye used relative to 100 parts by mass of the liquid crystal mixture is 0.01 parts by mass to 40 parts by mass, and preferably 0.05 parts by mass to 15 parts by mass.

The compounds of the invention may also be used in the formation of a LCP layer by casting a LCP compound according to the first aspect of the invention or a LCP mixture according to the third aspect of the invention onto a substrate.

A third aspect of the invention therefore provides a method forming a LCP network comprising forming a LCP layer including a compound of formula (I) and cross-linking the layer.

LCP mixtures according to the third aspect of the invention may also be used in the manufacture of LCP networks in a similar way.

The invention also includes, in a forth aspect of the invention, a cross-linked LCP network comprising a compound of formula (I) in a cross-linked form.

Cross-linked LCP networks comprising a mixture according to the third aspect of the invention in cross-linked form may also be included in this aspect of the invention.

A fifth aspect of the invention provides the use of a compound of formula (I) in the preparation of an optical or an electro-optical device.

The use, in the preparation of an optical or electro-optical device, of liquid crystalline mixtures according to the third aspect of the invention is also included in this aspect of the invention.

A sixth aspect of the invention provides an optical or an electro-optical device comprising a compound of formula (I) in a cross-linked state.

An optical or electro-optical device comprising a LCP liquid crystalline mixture in a cross-linked state according to the third aspect of the invention is also included in this aspect of the invention.

The LCP mixture can be applied on a support. The support may be rigid or flexible and can have any form or shape. For example, it may be a body with complex surfaces. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as micro-structures like micro lenses or micro-prisms, or structures exhibiting abrupt changes of the shape, such as rectangular structures. Preferably, the support is transparent.

The support may be moving during the deposition of the LCP mixture. For example, a layer of the LCP mixture may be produced in a continuous roll to roll process by depositing the material composition onto a moving flexible foil, which is preferably plastic or metallic. The resulting film may then be wound on a roll together with the support foil or the film may be released from the support and is then wound as a free-standing film, without the support.

The support may have additional layers, such as organic, dielectric or metallic layers. The layers can have different functions, for example an organic layer can be coated as a primer layer which increases compatibility of the materials to be coated with the support. Metallic layers may be used as electrodes, for example when used in electrooptical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a retarder film, a polarizer, such as a polarizing film or a sheet polarizer, a reflective polarizer, such as the commercially available Vikuity™ DBEF film.

The LCP mixture may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A layer of a LCP mixture does not have to cover the full surface of a support. Rather than that, the layer may be applied in the form of a pattern, for example by printing, or may after deposition be treated to have the form of a pattern, for example by photo-lithographic methods.

Alignment of the LCP can be achieved by any known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush the support or imprint a directional microstructure to generate alignment capability. Alternatively, a thin layer of a material may be coated on the support which is especially designed regarding alignment performance. The layer may be further brushed or treated to have a directional microstructure on the surface, for example by imprinting. If the thin layer comprises a photo-orientable substance, alignment can be generated by exposure to aligning light.

The aligning surface of the substrate may exhibit a pattern of alignment directions in order to define an orientation pattern for the liquid crystals in the LCP layer. Preferably, an alignment layer comprising a photo-orientable substance is used for this purpose and the alignment pattern is generated by selective exposure to aligning light of different polarization planes.

The invention will now be described with reference to the following non-limiting examples. These examples are provided by way of illustration only. Variations on these examples falling within the scope of the invention will be apparent to a skilled person.

EXAMPLES

Definitions Used in the Examples $^1$H NMR: $^1$H nuclear magnetic resonance spectroscopy
DMSO-$d_6$: dimethylsulfoxide deuterated
300 MHz: 300 MegaHertz
m: multiplet, d: doublet, dd: doublet, t: triplet, s: singlet
DMF: dimethylformamide
HCl: hydrochloric acid
$Pd(PPh_3)_2Cl_2$: Bis(triphenylphosphine)palladium dichloride
DMAP: 4-Dimethylaminopyridine
NMP: N-Methyl-2-pyrrolidon
CuI: Copper iodide
$MgSO_4$: magnesium sulfate In the following examples, the thermotropic phases are abbreviated as follow:

$T_{(Cr\text{-}N)}$: transition temperature from crystal phase to nematic phase
$T_{(N\text{-}I)}$: transition temperature from nematic phase to isotropic phase

Example 1: Preparation of 3-[(6-bromo-2-naphthyl)oxy]-propan-1-ol Compound 1

A mixture of 20 g (85.81 mmol) of 6-bromo-2-naphthol, 15.41 g (111.55 mmol) of potassium carbonate, 1.7 g (10.29 mmol) of potassium iodide and 12.16 g (128.7 mmol) of 3-chloropropanol in 50 ml of NMP is heated at 80° C. for 18 h. The solution is then cooled down and poured into 400 ml of water/HCl solution. The obtained precipitate is filtered off and washed two times with 200 ml of water. The residue was further purified by flash column chromatography over silica gel using a 1:1 mixture of hexane/ethylacetate to give 22.47 g. After recrystallization from heptane/ethylacetate (10:1), 18.6 g of compound 1 was obtained as an off-white solid.

Example 2: Preparation of 6-[(6-bromo-2-naphthyl)oxy]-hexan-1-ol Compound 2

The title compound 2 is prepared according to the process described in example 1 for compound 1 with the proviso that 3-chloropropanol is replaced by 6-chlorohexanol.

Example 3: Preparation of 3-[(6-(2-trimethylsilyl-ethynyl)-2-naphthyl)oxy]-propan-1-ol Compound 3

Bis(Triphenylphosphine)palladium (II) chloride (2.1 g, 2.99 mmol), CuI (799 mg, 4.195 mmol), and 3-[(6-bromo-2-naphthyl)oxy]-propan-1-ol compound 1 are placed, in 83.4 ml of triethylamine. The mixture is stirred at 25° C. for 15 minutes, and (trimethylsilyl)acetylene (11.77 g, 119.8 mmol) is added. After stirring the suspension at 80° C. for 2 h, a solution of HCl is dropwise added. The mixture is stirred for 30 min, then filtered off through hyflosilica and washed three times with 100 ml of ethylacetate. The solution is extracted with ethylacetate. The combined organic layers are washed with 5 ml of water and dried with $MgSO_4$. After concentration of the solvent under vacuum, the residue is purified by flash chromatography over silica gel using a 1:1 mixture of hexane/ethylacetate to give 13.41 g of compound 3.

Example 4: Preparation of 6-[(6-(2-trimethylsilyl-ethynyl)-2-naphthyl)oxy]-hexan-1-ol Compound 4

The title compound 4 is prepared according to the process described in example 3 for compound 3 with the proviso that 3-[(6-bromo-2-naphthyl)oxy]-propan-1-ol compound 1 is replaced by 6-[(6-bromo-2-naphthyl)oxy]-hexan-1-ol compound 2.

Example 5: Preparation of 3-[(6-ethynyl-2-naphthyl)oxy]-propan-1-ol Compound 5

12.4 g (89.79 mmol) of potassium carbonate is added to in several portions to a solution of compound 3 in 135 ml of methanol. After stirring 1 h at room temperature, the reaction mixture is filtered off over Hyflo/silica that is then washed 3 times with 25 ml of methanol. The solution is then poured onto a solution of HCl in water and then extracted with ethylacetate. The combined organic layers are dried over $MgSO_4$. After concentration under vacuum 10.84 g of compound 5 as a yellowish solid is obtained.

Example 6: Preparation of 6-[(6-ethynyl-2-naphthyl)oxy]-hexan-1-ol Compound 6

The title compound 6 is prepared according to the process described in example 5 for compound 5 with the proviso that 3-[(6-(2-trimethylsilylethynyl)-2-naphthyl)oxy]-propan-1-ol is replaced by 6-[4-(2-trimethylsilylethynyl)phenoxy]-hexan-1-ol.

Example 7: Preparation of methyl 2,5-diiodobenzoate Compound 7

2,5-Diiodobenzoic acid (15.0 g, 40.11 mmol) is dissolved in methanol (40 ml). After addition of $H_2SO_4$ (conc., 4 ml), the clear colorless solution is heated to reflux for 6 h. The reaction mixture is allowed to cool to ambient temperature and is poured on ice. Extraction with ethyl acetate and evaporation of the solvent lead to the title compound 7, which was dried under vacuum at 40° C. (14.93 g, 38.48 mmol).

lized from acetonitrile (130 ml) to afford the title compound (4.91 g, 7.34 mmol) as a beige solid.

Example 10: Preparation of hexyl 2,5-bis[2-[6-(6-hydroxyhexyl)-2-naphthyl]ethynyl]benzoate Compound 10

The title compound 10 is prepared according to the process described in example 9 for compound 9 with the proviso that methyl 2,5-diiodobenzoate compound 7 is replaced by hexyl 2,5-diiodobenzoate compound 8.

Example 11: Preparation of methyl 2,5-bis[2-[6-(3-hydroxypropoxy)-2-naphthyl]ethynyl]benzoate Compound 11

The title compound 11 is prepared according to the process described in example 9 for compound 9 with the proviso that 6-[(6-ethynyl-2-naphthyl)oxy]-hexan-1-ol compound 6 is replaced by 3-[(6-ethynyl-2-naphthyl)oxy]-propan-1-ol compound 5.

Example 12: Preparation of hexyl 2,5-bis[2-[6-(3-hydroxypropoxy)-2-naphthyl]ethynyl]benzoate Compound 12

The title compound 12 is prepared according to the process described in example 19 for compound 19 with the proviso that 6-[(6-ethynyl-2-naphthyl)oxy]-hexan-1-ol compound 6 is replaced by 33-[(6-ethynyl-2-naphthyl)oxy]-propan-1-ol compound 5 and methyl 2,5-diiodobenzoate is replaced by hexyl 2,5-diiodobenzoate compound 8.

Example 13: Preparation of methyl 2,5-bis[2-[6-(6-prop-2-enoyloxyhexoxy)-2-naphthyl]ethynyl]benzoate Compound 13

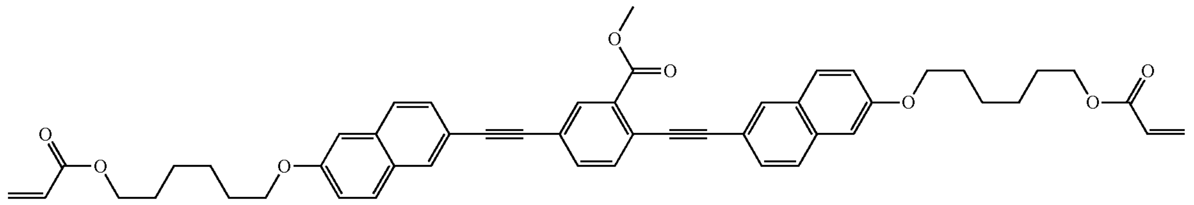 [SMILES: C=CC(=O)OCCCCCCOc1ccc2cc(C#Cc3ccc(C#Cc4ccc5cc(OCCCCCCOC(=O)C=C)ccc5c4)c(C(=O)OC)c3)ccc2c1]

Example 8: Preparation of hexyl 2,5-diiodobenzoate Compound 8

The title compound 8 is prepared according to the process described in example 7 for compound 7 with the proviso that methanol is replaced by n-hexanol.

Example 9: Preparation of methyl 2,5-bis[2-[6-(6-hydroxyhexoxy)-2-naphthyl]ethynyl]benzoate Compound 9

Under $N_2$ atmosphere, 6-[(6-ethynyl-2-naphthyl)oxy]-hexan-1-ol compound 6 (4.5 g, 16.77 mmol), methyl 2,5-diiodobenzoate compound 7 (3.25 g, 8.38 mmol), $Pd(PPh_3)_2Cl_2$ (0.59 g, 0.84 mmol), CuI (0.318 g, 1.67 mmol) and triphenylphosphine (0.438 g, 1.67 mmol) are suspended in triethylamine (60 ml). The mixture is stirred at 60° C. for 6 h. After cooling to ambient temperature, the mixture is poured into ice water (50 ml) and acidified with HCl to pH 1. The precipitate is filtered off and the residue is recrystal- Methyl 2,5-bis[2-[6-(6-hydroxyhexoxy)-2-naphthyl]ethynyl]benzoate compound 9 (4.91 g, 7.34 mmol) is suspended in 100 ml of tetrahydrofuran and N,N-dimethylaniline (3.56 g, 29.4 mmol) is added. The mixture is cooled to 0° C. and 2-propenoyl chloride (3.98 g, 44.0 mmol) is added dropwise followed by DMAP (0.179 g, 1.47 mmol). The reaction mixture is stirred at 0-5° C. for 2 h. After pouring the reaction mixture into ice water, extraction with ethyl acetate is followed. Evaporation and recrystallization in acetonitrile lead to the title compound (1.71 g, 2.2 mmol) as a beige solid.

Liquid crystal phase Transition: Compound 13 is observed with a polarizing microscope under cross polarizers to determine its phase transition temperature. As a result, when the temperature increases, the crystalline phase changes into nematic phase at 85° C. ($T_{(Cr\text{-}N)}$) and the isotropic phase appears to be at 190° C. ($T_{(N\text{-}I)}$).

$^1H$ NMR (300 MHz) in DMSO-$d_6$: 8.16 (s, 1H), 8.10 (m, 2H), 7.87 (m, 4H), 7.78 (m, 2H), 7.58 (m, 2H), 7.37 (m, 2H), 7.23 (m, 2H), 6.32 (m, 2H), 6.17 (m, 2H), 5.92 (m, 2H), 4.11 (m, 8H), 3.97 (s, 3H), 1.80 (m, 4H), 1.66 (m, 4H), 1.45 (m, 8H).

Example 14: Preparation of hexyl 2,5-bis[2-[6-(6-prop-2-enoyloxyhexoxy)-2-naphthyl]ethynyl]benzoate Compound 14

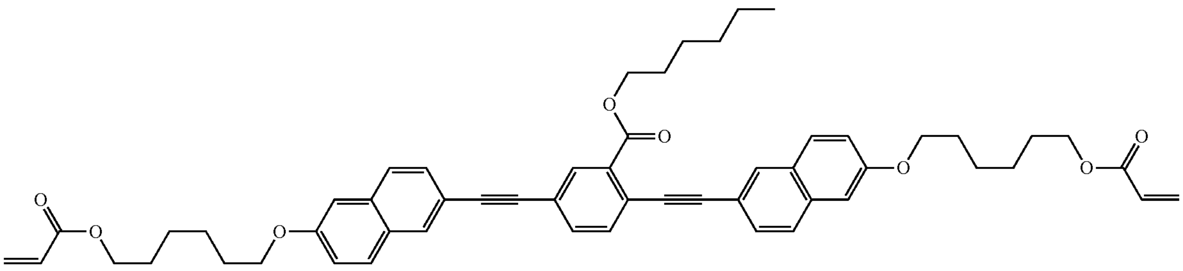 [SMILES: C=CC(=O)OCCCCCCOc1ccc2cc(C#Cc3ccc(C#Cc4ccc5cc(OCCCCCCOC(=O)C=C)ccc5c4)c(C(=O)OCCCCCC)c3)ccc2c1]

The title compound 14 is prepared according to the process described in example 13 for compound 13 with the proviso that Methyl 2,5-bis[2-[6-(6-hydroxyhexoxy)-2-naphthyl]ethynyl]benzoate compound 9 is replaced by hexyl 2,5-bis[2-[6-(6-hydroxyhexoxy)-2-naphthyl]ethynyl]benzoate compound 10. Purification by flash chromatography over silica gel using ethyl acetate/heptane (mixture 1:1) provides the title compound (1.16 g, 1.37 mmol, 22%) as a beige solid.

Liquid crystal phase Transition: Compound 14 is observed with a polarizing microscope under cross polarizers to determine its phase transition temperature. As a result, when the temperature increases, the crystalline phase changes into nematic phase at 60° C. ($T_{(Cr\text{-}N)}$) and the isotropic phase appears to be above 115° C. ($T_{(N\text{-}I)}$).

$^1$H NMR (300 MHz) in DMSO-$d_6$: 8.17 (m, 1H), 8.09 (s, 1H), 8.06 (d, 1H), 7.86 (m, 4H), 7.78 (m, 2H), 7.57 (m, 2H), 7.37 (m, 2H), 7.22 (m, 2H), 6.32 (m, 2H), 6.16 (m, 2H), 5.92 (m, 2H), 4.36 (m, 2H), 4.13 (m, 8H), 1.80 (m, 4H), 1.66 (m, 4H), 1.45 (m, 12H), 1.19 (m, 4H), 0.76 (t, 3H).

Example 15: Preparation of methyl 2,5-bis[2-[6-(3-prop-2-enoyloxypropoxy)-2-naphthyl]ethynyl]benzoate Compound 15

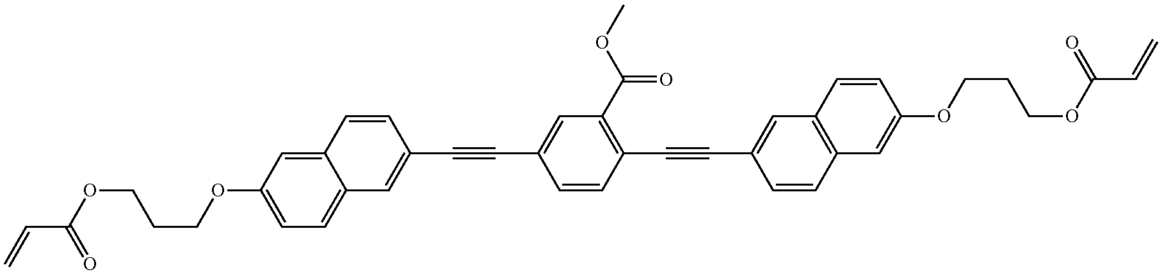 [SMILES: C=CC(=O)OCCCOc1ccc2cc(C#Cc3ccc(C#Cc4ccc5cc(OCCCOC(=O)C=C)ccc5c4)c(C(=O)OC)c3)ccc2c1]

The title compound 15 is prepared according to the process described in example 13 for compound 13 with the proviso that Methyl 2,5-bis[2-[6-(6-hydroxyhexoxy)-2-naphthyl]ethynyl]benzoate compound 9 is replaced by methyl 2,5-bis[2-[6-(3-hydroxypropoxy)-2-naphthyl]ethynyl]benzoate compound 11. Purification by flash chromatography over silica gel using ethyl acetate provides the title compound (2.75 g, 3.97 mmol, 94%) as a yellowish solid.

Liquid crystal phase Transition: Compound 15 is observed with a polarizing microscope under cross polarizers to determine its phase transition temperature. As a result, when the temperature increases, the crystalline phase changes into nematic phase at 79° C. ($T_{(Cr\text{-}N)}$) and the isotropic phase appears to be above 200° C. ($T_{(N\text{-}I)}$).

$^1$H NMR (300 MHz) in DMSO-$d_6$: 8.16 (s, 1H), 8.11 (s, 1H), 8.08 (d, 1H), 7.87 (m, 4H), 7.78 (m, 2H), 7.59 (m, 2H), 7.40 (m, 2H), 7.23 (m, 2H), 6.35 (m, 2H), 6.20 (m, 2H), 5.95 (m, 2H), 4.32 (m, 4H), 4.21 (m, 4H), 3.96 (s, 3H), 2.16 (m, 4H).

Example 16: Preparation of hexyl 2,5-bis[2-[6-(3-prop-2-enoyloxypropoxy)-2-naphthyl]ethynyl]benzoate Compound 16

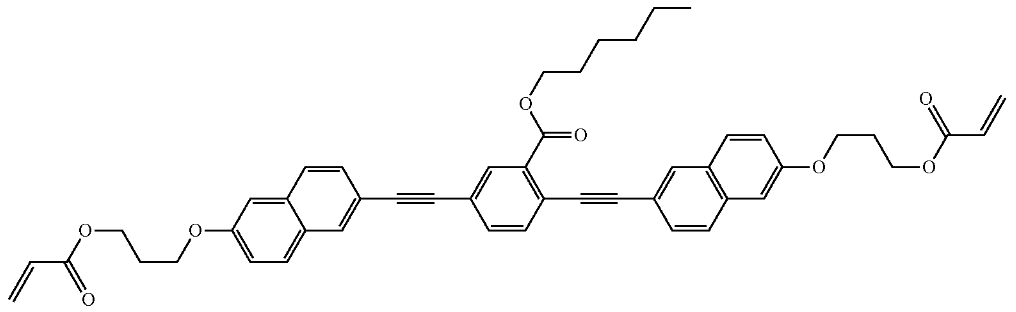 [SMILES: C=CC(=O)OCCCOc1ccc2cc(C#Cc3ccc(C#Cc4ccc5cc(OCCCOC(=O)C=C)ccc5c4)c(C(=O)OCCCCCC)c3)ccc2c1]

The title compound 16 is prepared according to the process described in example 13 for compound 13 with the proviso that Methyl 2,5-bis[2-[6-(6-hydroxyhexoxy)-2-naphthyl]ethynyl]benzoate compound 9 is replaced by hexyl 2,5-bis[2-[6-(3-hydroxypropoxy)-2-naphthyl]ethynyl]benzoate compound 12. Purification by flash chromatography over silica gel using ethyl acetate provides the title compound (2.48 g, 3.25 mmol, 92%) as a yellow solid.

Liquid crystal phase Transition: Compound 16 is observed with a polarizing microscope under cross polarizers to determine its phase transition temperature. As a result, when the temperature increases, the crystalline phase changes into nematic phase at 123° C. ($T_{(Cr-N)}$) and the isotropic phase appears to be at 163° C. ($T_{(N-I)}$).

$^1$H NMR (300 MHz) in DMSO-$d_6$: 8.17 (s, 1H), 8.10 (s, 1H), 8.06 (d, 1H), 7.87 (m, 4H), 7.79 (m, 2H), 7.58 (m, 2H), 7.40 (m, 2H), 7.24 (m, 2H), 6.36 (m, 2H), 6.20 (m, 2H), 5.95 (m, 2H), 4.32 (m, 6H), 4.22 (m, 4H), 2.16 (m, 4H), 1.73 (m, 2H), 1.39 (m, 2H), 1.19 (m, 4H), 0.75 (t, 3H).

Example 17: Preparation of an Orientation Layer Using Photoalignment Materials

A glass substrate is spin-coated with a Photoalignment Composition (3% solid content of a photoaligning material in cyclopentanone as described in the patent publication WO2012/085048: photoactive polymer materials use as orienting layer for liquid crystals). The film is dried at 180° C. for 10 min and the resulting film thickness is about 100 nm. Then, the film is exposed to aligning light, which is collimated and linearly polarized UV (LPUV) light (280-320 nm) with 500 mJ/cm$^2$. The plane of polarization is 0° with regard to a reference edge on the substrate.

Example 18: Preparation of Optical Film from Compound 16

A 15.0 w % solution is prepared by mixing the 14.775 w % compound 16, 0.150 w % of Irgacure® 369 (having the chemical structure of 2-Benzyl-2-dimethylamino-1-(4-morpholinophenyl)-butanone-1), 0.075 w % of Tinuvin® 123 (having the chemical structure of Bis(1-octyloxy-2,2,6,6-tetramethyl-4-piperidyl)sebacate) in cyclopentanone and stirred thoroughly till the solid is completely dissolved at room temperature. The above polymer solution was spin-coated onto a glass plate with the orientation layer of Example 17 to form a liquid crystal film. This film is dried at 148° C. for 1 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 19: Preparation of Optical Film from Compound 15

A 15.0 w % solution is prepared by mixing the 14.775 w % compound 15, 0.150 w % of Irgacure® 369 (having the chemical structure of 2-Benzyl-2-dimethylamino-1-(4-morpholinophenyl)-butanone-1), 0.075 w % of Tinuvin® 123 (having the chemical structure of Bis(1-octyloxy-2,2,6,6-tetramethyl-4-piperidyl)sebacate) in cyclopentanone and stirred thoroughly till the solid is completely dissolved at room temperature. The above polymer solution was spin-coated onto a glass plate with the orientation layer of Example 1 to form a liquid crystal film. This film is dried between 100-120° C. for 1 to 5 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very bad oriented nematic mesophase at room temperature.

Example 20: Preparation of Optical Film from Compound 14

A 15.0 w % solution is prepared by mixing the 14.775 w % compound 14, 0.150 w % of Irgacure® 369 (having the chemical structure of 2-Benzyl-2-dimethylamino-1-(4-morpholinophenyl)-butanone-1), 0.075 w % of Tinuvin® 123 (having the chemical structure of Bis(1-octyloxy-2,2,6,6-tetramethyl-4-piperidyl)sebacate) in cyclopentanone and stirred thoroughly till the solid is completely dissolved at room temperature. The above polymer solution was spin-coated onto a glass plate with the orientation layer of Example 1 to form a liquid crystal film. This film is dried at 80° C. for 1 min and then 100° C. for 1 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 21: Preparation of Optical Film from Compound 13

A 15.0 w % solution is prepared by mixing the 14.775 w % compound 13, 0.150 w % of Irgacure® 369 (having the chemical structure of 2-Benzyl-2-dimethylamino-1-(4-morpholinophenyl)-butanone-1), 0.075 w % of Tinuvin® 123 (having the chemical structure of Bis(1-octyloxy-2,2,6,6-tetramethyl-4-piperidyl)sebacate) in cyclopentanone and stirred thoroughly till the solid is completely dissolved at room temperature. The above polymer solution was spin-coated onto a glass plate with the orientation layer of Example 1 to form a liquid crystal film. This film is dried at 80° C. for 1 min and then 100° C. for 1 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film exhibited a very well oriented nematic mesophase at room temperature.

Example 22

The retardation at 550 nm of the sample described in example 18, example 20, example 21 are measured with an Ellipsometer. The thicknesses of the samples are measured by a contact stylus profilometer. The birefringence (Δn) was obtained from the determined retardation and thickness values according to the formula (Δn=Retardation/Thickness). The values are listed in Table 1.

TABLE 1

| Example | Thickness [nm] | Retardation at 550 nm [nm] | Δn at 550 nm |
|---|---|---|---|
| 18 (compound 16) | 540 ± 30 | 234.7 | 0.44 ± 0.01 |
| 20 (compound 14) | 660 ± 30 | 284.3 | 0.43 ± 0.01 |
| 21 (compound 13) | 750 ± 30 | 294.9 | 0.39 ± 0.02 |

The films of Example 18, 20, 21 have very high birefringence with values above 0.38. These new LCPs could be used for preparing phase retarder optical films as Quarter-Waveplate (QWP) and Half-Waveplate (HWP). A retarder transmits light and modifies its polarization state and is widely used in various display application or in security elements. The particularly high birefringence of these new LCPs leads to a significant thickness reduction of the retarder's films.

As an example, Table 2 shows the required thickness to get a quarter waveplate (λ/4) retarder (QWP) and Half-Waveplate (λ/2) retarder (HWP) at 550 nm with the compounds 16, 14, 13 used in respectively example 18, 20, 21.

TABLE 2

| Example | Required Thickness for QWP at 550 nm (nm) | Required Thickness for HWP at 550 nm (nm) |
|---|---|---|
| 18 | 313 | 626 |
| 20 | 320 | 640 |
| 21 | 353 | 706 |

For the examples 18, 20 and 21, the thickness required for a quarter waveplate (λ/4) retarder (QWP) is very low and below 400 nm.

The invention claimed is:

1. A compound of formula (I)

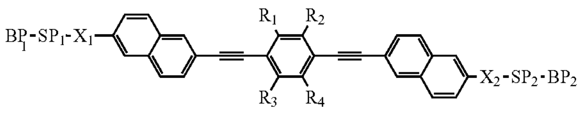

wherein $SP_1$ and $SP_2$ each independently from each other represents a spacer group of the formula —$(CH_2)$p-, wherein p is an integer of 0 to 18, with the proviso that p is 0 only when $X_1$ and $X_2$ are each a single bond, and wherein, when p is 1 to 18, up to four —$CH_2$— groups of said —$(CH_2)$p- group are optionally replaced by groups selected from the group consisting of —CH═CH—, —O—, —S—, —NR'—, —CO—, —COO—, —OOC—, —CONR'—, —OCOO— and —OCONR', with the further proviso that the spacer group does not contain two adjacent heteroatoms;

$X_1$ and $X_2$ each independently from each other is selected from the group consisting of —O—, —S—, —NR'—, —CO—, —COO—, —OOC—, —CONR'—, —OCOO—, —OCONR' and a single bond; in which R' is selected from the group consisting of hydrogen, a $C_1$-$C_{18}$ alkyl group;

$BP_1$ and $BP_2$ each independently from each other represents a polymerizable group, $R_1$, $R_2$, $R_3$ and $R_4$ each independently from each other are selected from the group consisting of hydrogen, —$OR_5$, —$COOR_5$, —$OCOR_5$, —$CONR_5$, —$OCOOR_5$, —$OCONR_5$ and a $C_1$-$C_{18}$ alkyl group, wherein $R_5$ is selected from the group consisting of a $C_1$-$C_{18}$ alkyl group, an aryl group, an aralkyl group and an alkylaryl group.

2. The compound according to claim 1, in which $BP_1$ and $BP_2$ each independently from each other are selected from the group consisting of $CH_2$═C(Ph)-, $CH_2$═CW—COO—, $CH_2$═CH—COO-Ph-, $CH_2$═CW—CO—NH—, $CH_2$═CH—O—, $CH_2$—CH—OOC—, Ph-CH═CH—, $CH_2$═CH-Ph-, $CH_2$—CH-Ph-O—, $R_3$-Ph-CH═CH—COO—, $R_3$—OOC—CH═CH-Ph-O— and 2-W-epoxyethyl, in which W represents hydrogen, chloride, aryl or a $C_1$-$C_6$ alkyl, and $R_3$ represents a $C_1$-$C_6$ alkyl with the proviso that when $R_3$ is attached to an aryl group it may also represent hydrogen or a $C_1$-$C_6$ alkoxy.

3. The compound according to claim 1, in which the integer p of the groups $SP_1$ and $SP_2$ is each independently from each other a value of from 1 to 12.

4. The compound according to claim 1, in which the groups $R_1$, $R_2$, $R_3$ and $R_4$ each independently from each other are selected from the group consisting of hydrogen, —$OR_5$, —$COOR_5$, —$OCOR_5$, —$OCOOR_5$, and $C_1$-$C_6$ alkyl, wherein $R_5$ is selected from the group consisting of a $C_1$-$C_{12}$ alkyl, with the proviso that at least one $R_1$, $R_2$, $R_3$ or $R_4$ is hydrogen.

5. The compound according to claim 1, in which at least two $R_1$, $R_2$, $R_3$ or $R_4$ are hydrogen.

6. A LCP mixture comprising the compound according to claim 1, wherein the compound is present in a non-cross-linked, non-polymerised form.

7. A LCP network comprising a compound according to claim 1, wherein the compound is in cross-linked or polymerised form.

8. A method for manufacturing an optical or electro-optical device comprising incorporating a compound according to claim 1 into the optical or electro-optical device.

9. An optical or electro-optical device including a compound according to claim 1.

10. A LCP network comprising a mixture according to claim 6 in cross-linked or polymerised form.

11. A method for manufacturing an optical or an electro-optical device, the method comprising:

(a) providing a mixture according to claim 6; and (b) incorporating the mixture into an optical or electro-optical device structure so as to form at least one optical or electro-optical element.

12. An optical or electro-optical device comprising a mixture according to claim 6.

13. An optical or electro-optical device comprising a network according to claim 7.

14. A method for manufacturing an optical or electro-optical device comprising incorporating a compound according to claim 2 into the optical or electro-optical device.

15. A method for manufacturing an optical or electro-optical device comprising incorporating a compound according to claim 3 into the optical or electro-optical device.

16. A method for manufacturing an optical or electro-optical device comprising incorporating a compound according to claim 4 into the optical or electro-optical device.

17. A method for manufacturing an optical or electro-optical device comprising incorporating a compound according to claim 5 into the optical or electro-optical device.

18. A method for manufacturing an optical or electro-optical device comprising incorporating a mixture according to claim 6 into the optical or electro-optical device.

* * * * *